J. G. PIERCE.
BREAD SLICING MACHINE.
APPLICATION FILED SEPT. 26, 1908.
935,925.
Patented Oct. 5, 1909.
2 SHEETS—SHEET 1.
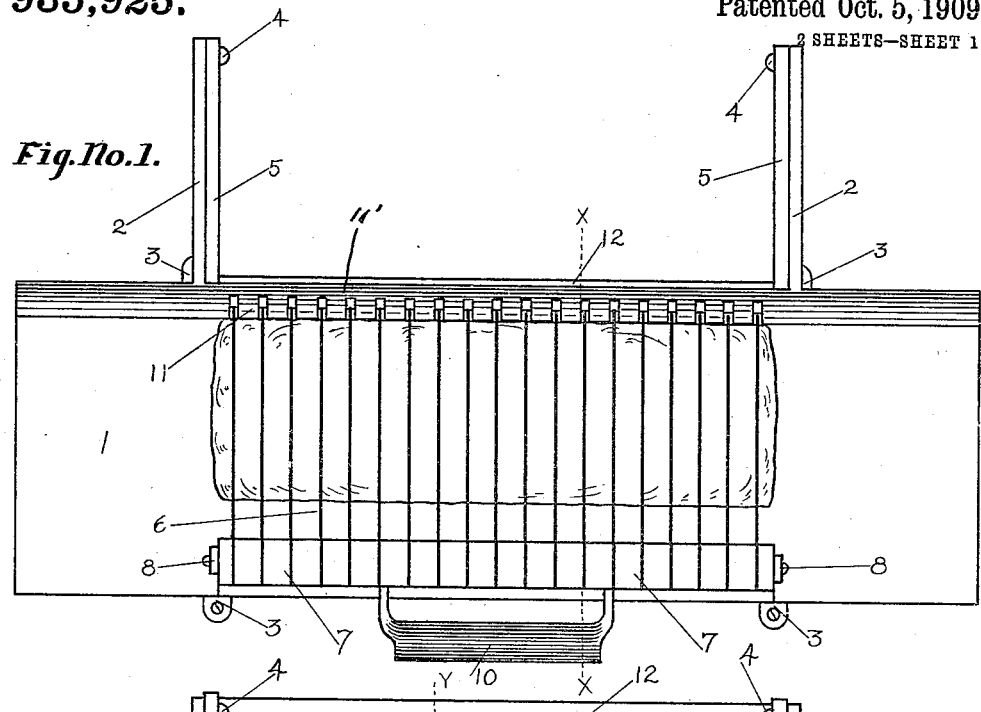
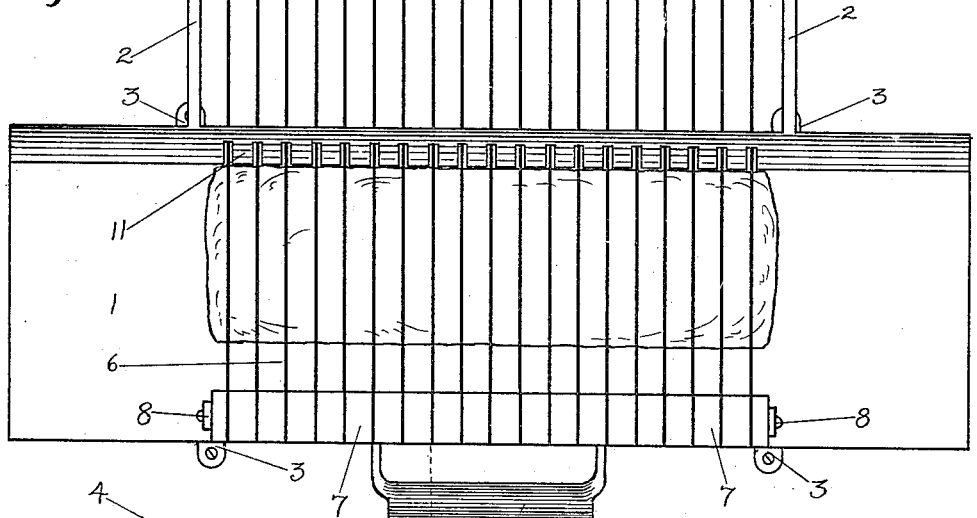
John G Pierce
Inventor
by J M Thomas
Attorney

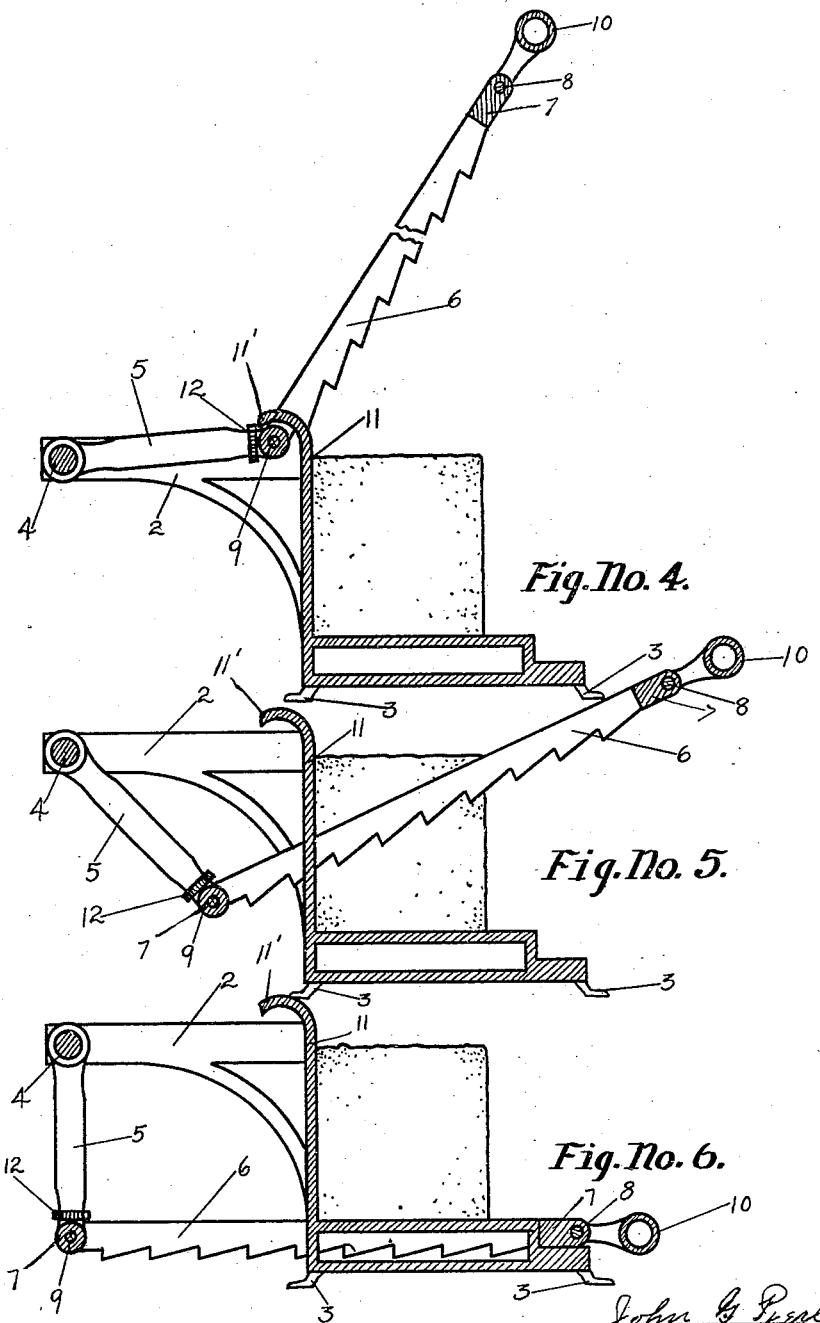

UNITED STATES PATENT OFFICE.

JOHN G. PIERCE, OF SALT LAKE CITY, UTAH.

BREAD-SLICING MACHINE.

935,925.  Specification of Letters Patent.  Patented Oct. 5, 1909.

Application filed September 26, 1908. Serial No. 454,939.

*To all whom it may concern:*

Be it known that I, JOHN G. PIERCE, a citizen of the United States, residing at Salt Lake City, in the county of Salt Lake and State of Utah, have invented certain new and useful Improvements in Bread-Slicing Machines, of which the following is a specification.

The object of my invention is to provide a knife, or cutting tool, for slicing bread or other cooked edibles, so that the slices will be uniform in thickness and the cutting easily and rapidly done. This I attain by the device illustrated in the accompanying drawings in which similar figures of reference indicate like parts throughout the several views.

Figure 1 is a plan view with the blades raised. Fig. 2 is a plan view with the blades down. Fig. 3 is an enlarged plan of one of the threaded lugs. Fig. 4 is a section on line $x$ $x$ Fig. 1. Fig. 5 is a section with blades partially down. Fig. 6 is a section on line $y$ $y$ Fig. 2.

The frame 1, of my invention is made of any strong material, preferably of metal, and has an upwardly extended back 11 having vertical slots or openings therein and has near each side a portion extending rearward forming brackets 2, and also is provided with perforated feet 3. The base of the frame 1 is so constructed that there is an open space between the upper and lower portions thereof (see Figs. 4, 5 and 6). The said upper portion is cut into sections, by slots or openings corresponding in width and adjacent in position to the lower end of the vertical slots in said back 11. Within these slots or openings are operated the blades.

The brackets 2 are constructed alike, except one is left and the other right hand in construction and position. The outer ends of said brackets 2 have threaded lugs 4 extending horizontally therefrom, upon which lugs are fitted one end of links 5, by threads provided therethrough that engage the threads on said lugs. To the other ends of the links 5 are secured the blades 6. The blades are held in alinement by the horizontally placed bar 12. The said blades 6 are spaced apart by washers 7, and held at one end by the bolt 8, and at the other end by the bolt 9, which are fitted to pass through the holes provided in the ends of the blades 6. The handle 10 is provided at one end of the said blade 6.

The base 1 is so spaced and grooved that the blades pass entirely through and below the object cut. The links 5, and the manner of connecting them to the brackets 2, at the one end, and to the knives at the other end, enable the operator to give to the cutting stroke, a combined vertical and horizontal direction, or either, as he desires. The thread connection between the brackets 2, and the links 5, secures a rigidity to the device, as is needed, when the force for cutting is applied. The cutting edge of the blades are preferably uneven and not parallel to the backs. The thickness of the spacing washers 7, determine the thickness of the slices and this may be changed as desired by using thinner washers.

It will be observed that the peculiar mounting of the blades 6, whereby they are connected so as to swing from the links 5 and in rear of the back 11, gives rise to peculiar advantages in the operation of the device. The back 11 being slotted constitutes a guide for the blades which causes said blades to move in a straight line vertically as they swing when operated to cut the bread. In other words, the back 11 virtually constitutes a guide through which the blades are adapted to slide or move as they are operated, and the coöperation of the parts 11 and 6 is such that the slices of bread will be cut of even thickness throughout, the desirability of this being evident.

The present machine performs the operation of bread cutting in a mechanically perfect manner. The upper edge of the back 11 is curved outwardly to form a stop 11′ coöperating with the pivoted ends of the blades to limit the swinging movement of the latter on the links 5.

Having thus described my invention I desire to secure by Letters Patent—

In a bread slicing machine, the combination of a base having an upwardly projecting back portion, the upper edge of which curves rearwardly to form a stop, brackets projecting rearwardly from said back, links pivoted to said brackets, a plurality of blades passing through the back and guided thereby, a bar connecting adjacent ends of said blades connected to said links to swing therewith, the stop on the back being adapted to co-act with the links to limit the movement of the blades, and means for swinging the blades to effect the bread slicing operation.

In testimony whereof I have affixed my signature in presence of two witnesses.

JOHN G. PIERCE.

Witnesses:
   Chas. H. Lenzi,
   Sam Raney.